R. S. HEISE.
PEDAL RUBBER.
APPLICATION FILED AUG. 29, 1919.

1,403,242. Patented Jan. 10, 1922.

Inventor:
Roscoe S. Heise,
By Dyrenforth, Lee, Chritton & Wiles,
Attys.

UNITED STATES PATENT OFFICE.

ROSCOE S. HEISE, OF MIDDLETOWN, OHIO, ASSIGNOR TO THE MIAMI CYCLE & MFG. CO., OF MIDDLETOWN, OHIO, A CORPORATION OF OHIO.

PEDAL RUBBER.

1,403,242. Specification of Letters Patent. Patented Jan. 10, 1922.

Application filed August 29, 1919. Serial No. 320,600.

*To all whom it may concern:*

Be it known that I, ROSCOE S. HEISE, a citizen of the United States, residing at Middletown, in the county of Butler and State of Ohio, have invented a new and useful Improvement in Pedal Rubbers, of which the following is a specification.

This application relates to pedal rubbers and is particularly adapted to be used on bicycles.

It is very desirable to make that part of a bicycle pedal on which the foot bears of rubber and to mount it in the pedal on a bolt passing longitudinally through a hole therein. Heretofore, however, it has been found very difficult to make a satisfactory pedal rubber for the reason that the bolt had a tendency to cut its way through the rubber, causing the part to be lost or thrown away long before it was otherwise worn out.

Figure 1:
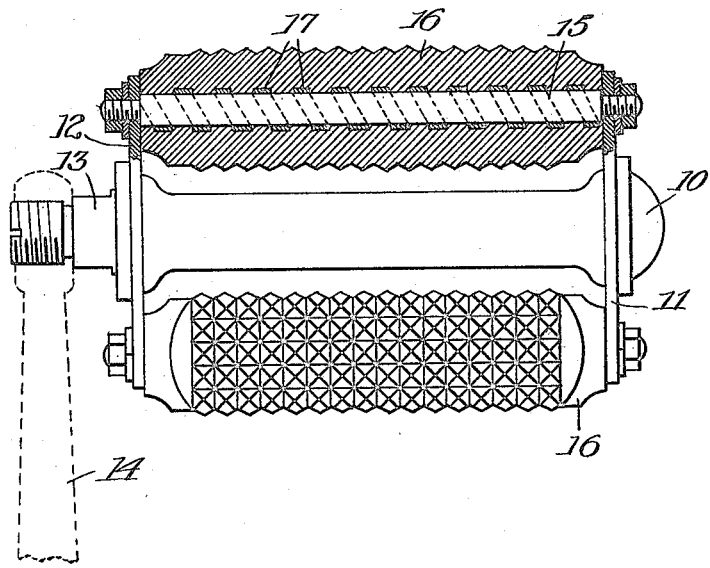
Figure 2:
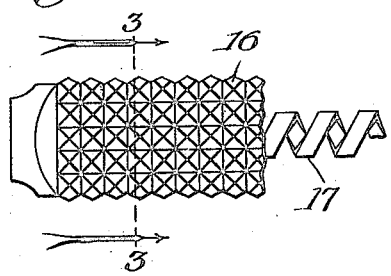
Figure 3:
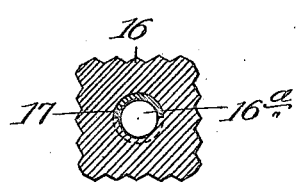

My invention which overcomes this objection is fully described in the following specification and shown in the drawing in which, Figure 1 is an elevation of a pedal showing one of my pedal rubbers in section;

Fig. 2 is an elevation of a pedal rubber with the rubber partly broken away; and Fig. 3 is a section on the line 3—3 of Fig. 2.

I have embodied my invention in a bicycle pedal 10 having end plates 11 and 12 which may be mounted in any desired manner to rotate about a spindle 13 which is screwed into a pedal crank 14. This pedal has bolts 15 connecting the end plates 11 and 12 and passing through longitudinal holes 16ª in pedal rubbers 16.

My pedal rubber differs from the ordinary construction by having a metal reinforced longitudinal hole. This reinforcement is preferably in the form of a helical spring or sleeve 17 formed of a flat steel strip which is wound on a mandrel in long lengths and cut to the length desired for use in the pedal rubber.

These springs are then placed on cores in a mould and the mould filled with an unvulcanized rubber mixture which is forced intimately around the spring. Heat is then applied and the rubber is vulcanized in any well known manner. The rubber thus strongly adheres to the spring and as the pressure of the foot is applied to the pedal, neither the spring nor the bolt therein can cut its way through the rubber.

While I have shown and described but a single embodiment of my invention, it is to be understood that it is capable of many modifications. Changes therefore in the construction and arrangement may be made without departing from the spirit and scope of the invention as disclosed in the appended claims.

What I claim as new and desire to secure by Letters Patent is:

1. The combination of a bicycle pedal rubber having a central longitudinal opening therethrough for the supporting rod thereof, with a spiral wire sleeve surrounding said opening and contacting with and forming a bearing for the pedal rod, substantially as set forth.

2. The combination of a bicycle pedal rubber having a central longitudinal opening therethrough for the supporting rod thereof, with a spiral wire sleeve surrounding said opening and vulcanized in said rubber and contacting with and forming a bearing for the pedal rod, substantially as set forth.

ROSCOE S. HEISE.